United States Patent
Nakano et al.

(10) Patent No.: US 11,445,760 B2
(45) Date of Patent: Sep. 20, 2022

(54) SMOKING SYSTEM, POWER SUPPLY CONTROL METHOD, PROGRAM, PRIMARY DEVICE, AND SECONDARY DEVICE

(71) Applicant: JAPAN TOBACCO INC., Tokyo (JP)

(72) Inventors: Takuma Nakano, Tokyo (JP); Hajime Fujita, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 297 days.

(21) Appl. No.: 16/563,409

(22) Filed: Sep. 6, 2019

(65) Prior Publication Data
US 2019/0387806 A1 Dec. 26, 2019

Related U.S. Application Data

(63) Continuation of application No. PCT/JP2017/009946, filed on Mar. 13, 2017.

(51) Int. Cl.
*A24F 47/00* (2020.01)
*A24F 40/50* (2020.01)
(Continued)

(52) U.S. Cl.
CPC .............. *A24F 40/50* (2020.01); *A24F 40/95* (2020.01); *G05B 15/02* (2013.01); *A24F 40/20* (2020.01); *H02J 7/342* (2020.01)

(58) Field of Classification Search
CPC ...... H02J 7/00308; H02J 7/0068; H02J 7/342; H02J 7/0029; A24F 40/95; A24F 40/20; A24F 40/50; G05B 15/02
See application file for complete search history.

(56) References Cited

U.S. PATENT DOCUMENTS

2011/0265806 A1* 11/2011 Alarcon .................. A24F 40/50
 131/273
2015/0020831 A1 1/2015 Weigensberg et al.
(Continued)

FOREIGN PATENT DOCUMENTS

CN 101989300 A 2/2011
CN 104105417 A 10/2014
(Continued)

OTHER PUBLICATIONS

European Search Report for European Application No. 17900577.2 dated Oct. 6, 2020.
(Continued)

*Primary Examiner* — Shogo Sasaki
(74) *Attorney, Agent, or Firm* — Birch, Stewart, Kolasch & Birch, LLP

(57) ABSTRACT

A smoking system that smoothly switches between a charge mode and a direct heating mode is provided with: a secondary device with a load for atomizing an aerosol source or heating a flavor source and a power source capable of supplying power to the load; a primary device which, when connected to the secondary device, is capable of supplying power to the load and the power source; and a control unit capable of executing a first mode in which the power is supplied from the primary device to the load and a second mode in which the power is supplied from the primary device to the power source. During a first transition, which is from the first mode to the second mode, and/or a second transition, which is from the second mode to the first mode, the control unit executes, in a time between the modes, a transition mode involving a transition time for changing a preset variable relating to power supply.

16 Claims, 9 Drawing Sheets

(51) Int. Cl.
  *G05B 15/02* (2006.01)
  *A24F 40/95* (2020.01)
  *H02J 7/34* (2006.01)
  *A24F 40/20* (2020.01)

(56) References Cited

U.S. PATENT DOCUMENTS

| 2015/0173124 | A1* | 6/2015 | Qiu | A24F 40/60 |
| | | | | 131/328 |
| 2017/0119053 | A1* | 5/2017 | Henry, Jr. | A24F 40/65 |
| 2019/0124995 | A1* | 5/2019 | Henry, Jr. | A24F 40/60 |

FOREIGN PATENT DOCUMENTS

| EP | 3 125 400 A2 | 2/2017 |
| JP | 2012-527222 A | 11/2012 |
| JP | 2015-500647 A | 1/2015 |
| WO | WO 2399/112182 A1 | 9/2009 |
| WO | WO 2010/133342 A1 | 11/2010 |
| WO | WO 2013/093695 A1 | 6/2013 |
| WO | WO 2013/102612 A2 | 7/2013 |

OTHER PUBLICATIONS

Chinese Office Action and Search Report for Chinese Application No. 201780088312.4 dated July 29, 2021, with English transistion.
International Search Report, issued in PCT/JP2017/009946, PCT/ISA/210, dated May 16, 2017.

* cited by examiner

|  | SW1 | SW2 | SW3 | SW4 |
|---|---|---|---|---|
| Normal smoking mode | ON | ON | OFF | ON |
| Normal non-smoking mode | OFF | OFF | OFF | OFF |
| Charging mode | OFF | OFF | ON | OFF |
| Direct heating mode | ON | ON | OFF | OFF |

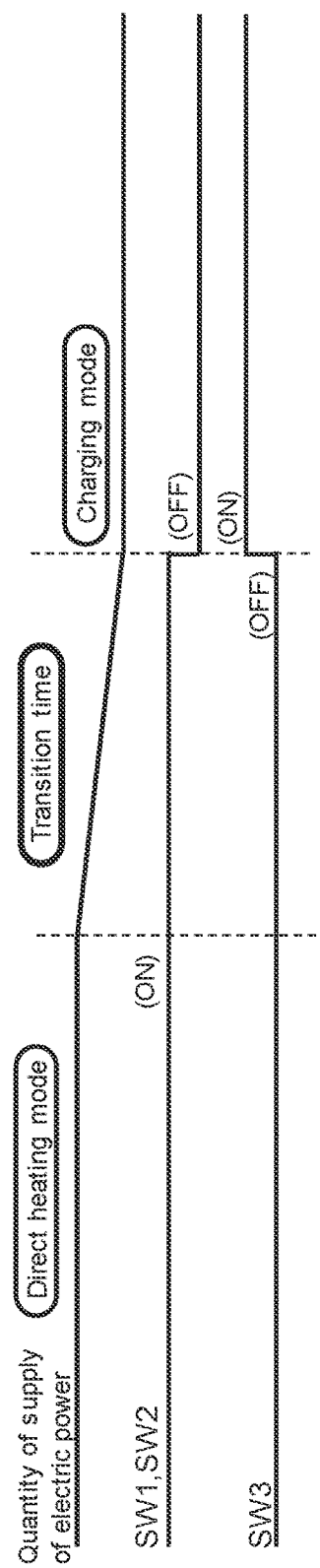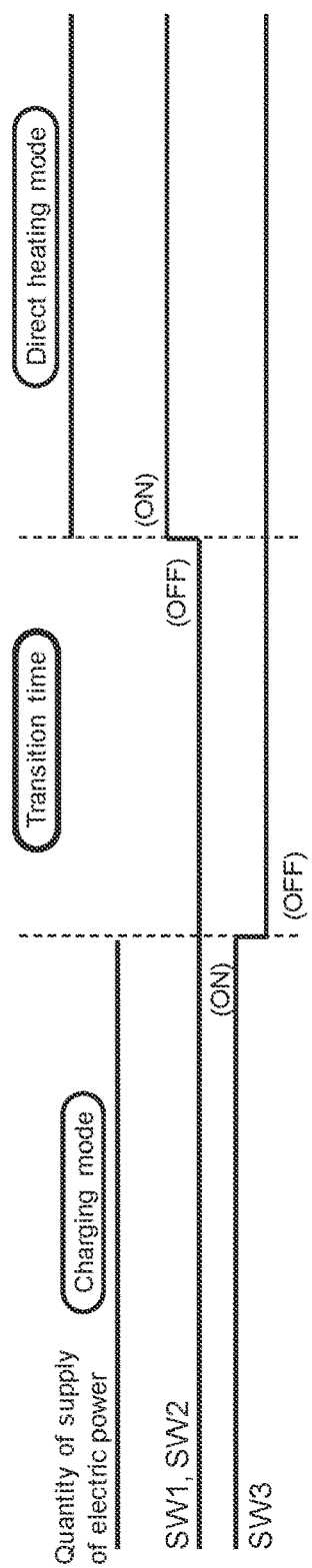

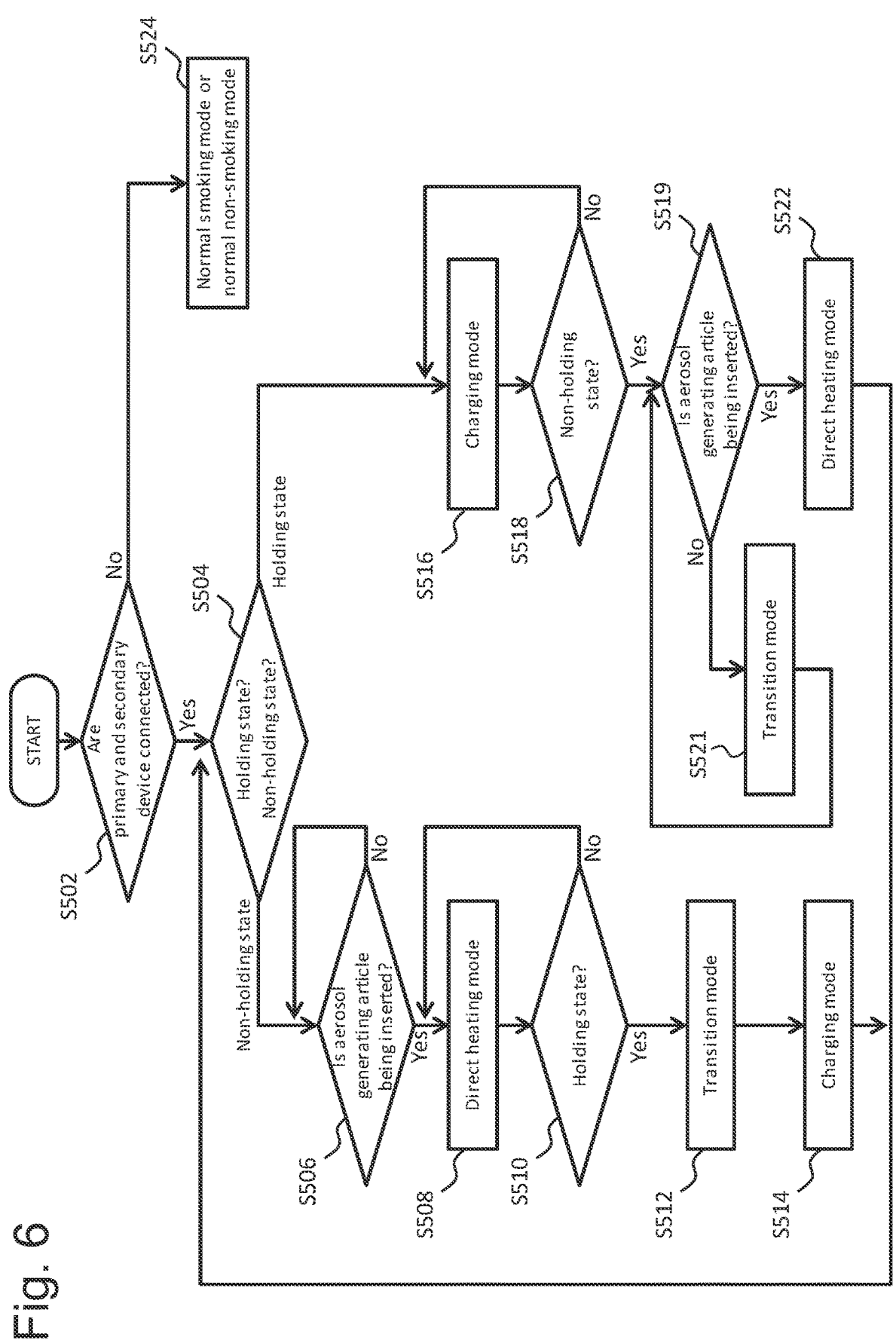

SMOKING SYSTEM, POWER SUPPLY CONTROL METHOD, PROGRAM, PRIMARY DEVICE, AND SECONDARY DEVICE

CROSS REFERENCE TO RELATED APPLICATIONS

The present application is a continuation application of International Application No. PCT/JP2017/009946, filed on Mar. 13, 2017.

TECHNICAL FIELD

The present invention relates to a smoking system, a method for controlling supply of electric power, a program, a primary device, and a secondary device.

BACKGROUND ART

A smoking system having a construction for charging, by use of a portable charger, a heating device for heating an aerosol generating article by an electric heater, every time after a predetermined number of times of smoking actions are completed (for example, refer to Patent Literature 1). Especially, in the case that a large quantity of electric power is required for making aerosol to be released from an aerosol generating article, it is impossible to perform successive smoking actions since no smoking action can be performed during a charging period.

For solving the above problem, there is an idea such that aerosol is generated by directly supplying electric power from a generator to a heater, as disclosed in Patent Literature 2, for example. In such a case, it is necessary to switch between a mode for charging an internal rechargeable battery of a heating device by a charger in a conventional charging manner and a mode for directly supplying electric power from the charger to a heater.

CITATION LIST

Patent Literature

Patent Literature 1: Japanese Patent Application Public Disclosure No. 2012-527222
Patent Literature 2: Japanese Patent Application Public Disclosure No. 2015-500647

SUMMARY OF INVENTION

Technical Problem

As widely known, it is preferable to adjust, according to characteristics, use, and so on of an object to which electric power is to be supplied, the quantity (rate) of supplied electric power to have an appropriate value. Thus, in general, the quantity of electric power to be supplied when charging a rechargeable battery is different from the quantity of electric power to be supplied when the electric power is supplied to a heater. Accordingly, regarding transition between the mode for charging an internal rechargeable battery by a charger and the mode for directly supplying electric power to a heater, if switching between the above two mode is immediately performed without any special consideration as disclosed in Patent Literature 2, there may be risks that a rechargeable battery is made to be deteriorated and/or a heater does not work sufficiently. Further, if direct supply of electric power to the heater is started before an aerosol generating article is attached to the heating device, there may be a risk that electric power supplied by the charger is wasted.

The present invention has been made by taking the above matters into consideration; and an object of the present invention is to smoothly perform switching between a charging mode and a direct heating mode, while guaranteeing its safety and user-friendliness.

Solution to Problem

For solving the above problems, a mode of the present invention comprises a smoking system which comprises: a secondary device which comprises a load for atomizing an aerosol source or heating a flavor source, and a power source which can supply electric power to the load; a primary device which can supply, when it is connected to the secondary device, electric power to the load and the power source; and a control part which can execute a first mode for supplying electric power from the primary device to the load and a second mode for supplying electric power from the primary device to the power source; wherein, at timing between the first mode and the second mode in at least one of a first transition, that is transition from the first mode to the second mode, and a second transition, that is transition from the second mode to the first mode, the control part executes a transition mode that comprises transition time for changing a predetermined variable relating to supply of electric power.

Another mode of the present invention comprises the smoking system in the above mode, wherein the control part executes the transition mode in both the first transition and the second transition.

Another mode of the present invention comprises the smoking system in the above mode, wherein the length of the transition time in the transition mode in the first transition is different from the length of the transition time in the transition mode in the second transition.

Another mode of the present invention comprises the smoking system in the above mode, wherein the length of the transition time in the transition mode in the first transition is shorter than the length of the transition time in the transition mode in the second transition.

Another mode of the present invention comprises the smoking system in the above mode, wherein the predetermined variable is a quantity of electric power supplied from the primary device to the secondary device; and the control part executes the respective modes in such a manner that: a first quantity of electric power is supplied from the primary device to the load in the first mode; a process for reducing the quantity of to-be-supplied electric power from the first quantity is applied to the primary device, and supply of electric power from the primary device to the power source is not performed, in the transition mode in the first transition; and a second quantity, that is smaller than the first quantity, of electric power is supplied from the primary device to the power source in the second mode.

Another mode of the present invention comprises the smoking system in the above mode, wherein the smoking system comprises a means which can switch between a state that electric power can be supplied from the primary device to the power source and a state that electric power cannot be supplied from the primary device to the power source; wherein the predetermined variable is a quantity of electric power supplied from the primary device to the secondary device; wherein the control part executes the respective modes in such a manner that: a first quantity of electric power is supplied from the primary device to the load, in the first mode; the means is controlled to enter the state that electric power cannot be supplied from the primary device to the power source, and a process for reducing the quantity of to-be-supplied electric power from the first quantity is applied to the primary device, in the transition mode in the first transition; and the above means is controlled to enter the state that electric power can be supplied from the primary device to the power source, and a second quantity, that is smaller than the first quantity, of electric power is supplied from the primary device to the power source, in the second mode.

Another mode of the present invention comprises the smoking system in the above mode, wherein the above means is a switch positioned between the primary device and the power source; and the control part electrically disconnects the primary device from the power source by performing control for opening the switch in the transition mode in the first transition, and electrically connects the primary device to the power source by performing control for closing the switch in the second mode.

Another mode of the present invention comprises the smoking system in the above mode, wherein the smoking system comprises a diode which is positioned between the primary device and the power source, and a forward direction of the diode is a direction from the primary device to the power source; wherein the above means is a regulator which can adjust a relative voltage between an output voltage of the primary device and a voltage of the power source; and the control part controls the regulator for making the output voltage of the primary device to be higher than the voltage of the power source in the transition mode in the first transition, and controls the regulator for making the voltage of the power source to be higher than the output voltage of the primary device in the second mode.

Another mode of the present invention comprises the smoking system in the above mode, wherein the control part applies, to the primary device, a process for gradually reducing the quantity of to-be-supplied electric power from the first quantity to the second quantity, and supplies the gradually reducing quantity of electric power from the primary device to the load.

Another mode of the present invention comprises the smoking system in the above mode, wherein the control part does not supply electric power from the primary device to the power source and the load in the transition mode in the first transition.

Another mode of the present invention comprises the smoking system in the above mode, wherein the smoking system comprises a switch that is positioned between the primary device and the power source and the load, and can switch between a state that electric power can be supplied from the primary device to the power source and the load and a state that electric power cannot be supplied from the primary device to the power source and the load; and the control part electrically disconnects the primary device from the power source and the load, by performing control to open the switch, in the transition mode in the first transition.

Another mode of the present invention comprises the smoking system in the above mode, wherein the primary device comprises a holding part that can hold connection between the secondary device and the primary device in a holding state, and can release the connection in a non-holding state; and the control part discriminates between the first transition and the second transition based on the state of the holding part.

Another mode of the present invention comprises the smoking system in the above mode, wherein the control part keeps the transition mode in the second transition, until the load is brought into contact with an aerosol generating article comprising an aerosol source in the non-holding state.

Another mode of the present invention comprises a method for controlling supply of electric power from a primary device to a secondary device in a smoking system, and the method comprises steps for: recognizing one of a first mode and a second mode as a mode that is being executed, wherein the first mode is that for allowing supply of electric power from the primary device to a load which is included in the secondary device and used for atomizing an aerosol source or heating a flavor source, and the second mode is that for allowing supply of electric power from the primary device to a power source which is included in the secondary device and is able to supply electric power to the load; receiving an instruction for performing transition from the mode that is being executed, that is one of the first mode and the second mode, to the other mode; and, at timing between the first mode and the second mode in at least one of a first transition, that is transition from the first mode to the second mode, and a second transition, that is transition from the second mode to the first mode, executing, in response to the instruction, a transition mode that comprises transition time for changing a predetermined variable relating to supply of electric power.

Another mode of the present invention comprises a program which makes a smoking system to perform the above method.

Another mode of the present invention comprises a primary device which can supply electric power to a load and a power source that are included in a secondary device when the primary device is connected to the secondary device, wherein the load atomizes an aerosol source or heats a flavor source, and the power source can supply electric power to the load; wherein the primary device comprises a control part which can execute a first mode for supplying electric power from the primary device to the load and a second mode for supplying electric power from the primary device to the power source; wherein, at timing between the first mode and the second mode in at least one of a first transition, that is transition from the first mode to the second mode, and a second transition, that is transition from the second mode to the first mode, the control part executes a transition mode that comprises transition time for changing a predetermined variable relating to supply of electric power.

Another mode of the present invention comprises a secondary device which comprises a load for atomizing an aerosol source or heating a flavor source and a power source which can supply electric power to the load, and is connectable to a primary device which can supply electric power to the load and the power source; wherein the secondary device comprises a control part which can execute a first mode for supplying electric power from the primary device to the load and a second mode for supplying electric power from the primary device to the power source; wherein, at timing between the first mode and the second mode in at least one of a first transition, that is transition from the first mode to the second mode, and a second transition, that is transition from the second mode to the first mode, the control part executes a transition mode that comprises transition time for changing a predetermined variable relating to supply of electric power.

Advantageous Effects of Invention

According to the present invention, switching between a charging mode and a direct heating mode can be performed smoothly, while guaranteeing its safety and user-friendliness.

BRIEF DESCRIPTION OF DRAWINGS

FIG. 3 shows state transitions in an electric circuit 200 with respect to plural operation modes in the smoking system 100 according to an embodiment of the present invention.

FIG. 4C is an example of a timing chart showing transitions of states of the smoking system 100 when the direct heating mode is switched to the charging mode.

FIG. 4D is an example of a timing chart showing transitions of states of the smoking system 100 when the charging mode is switched to the direct heating mode.

FIG. 6 is a flow chart showing another example process 600 for making a control part (the control part 134 and/or the control part 154) in the smoking system 100 according to an embodiment of the present invention to perform control for switching between operation modes of the smoking system 100.

DESCRIPTION OF EMBODIMENTS

In the following description, embodiments of the present invention will be explained in detail with reference to the figures.

Figure 1:
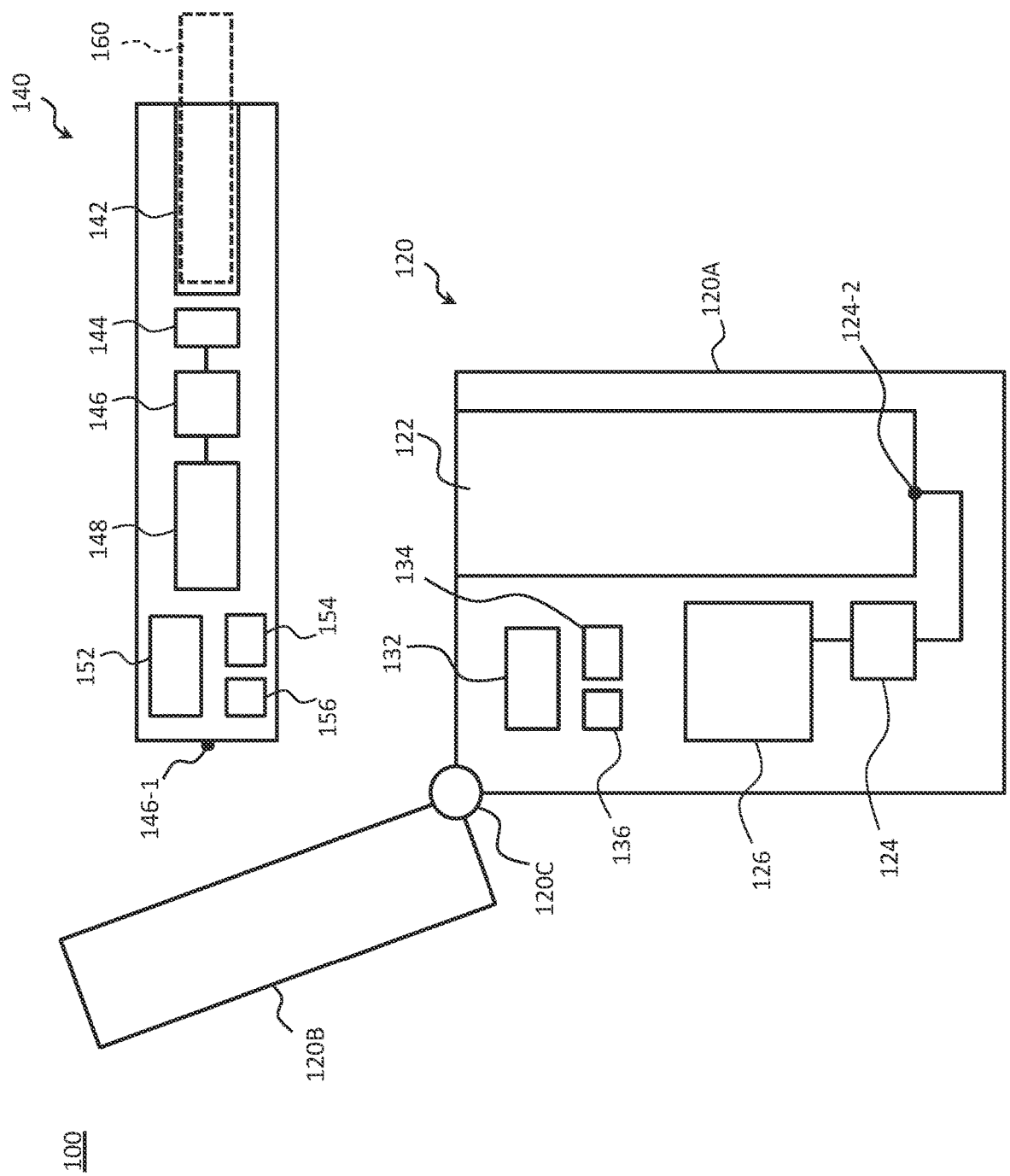
FIG. 1 is a configuration diagram of a smoking system 100 according to an embodiment of the present invention.

FIG. 1 is a configuration diagram of a smoking system 100 according to an embodiment of the present invention. It should be reminded that FIG. 1 shows respective elements included in the smoking system 100 in a schematic and conceptual manner, and does not show precise arrangement, shapes, sizes, positional relationship, and so on of the respective elements and the smoking system 100.

As shown in FIG. 1, the smoking system 100 comprises a primary device 120 and a secondary device 140. The smoking system 100 is constructed in such a manner that it can take a first use form wherein the secondary device 140 is electrically connected to the primary device 120 and a second use form wherein the secondary device 140 is electrically disconnected from the primary device 120. For example, with respect to the example smoking system 100 shown in FIG. 1, the secondary device 140 is electrically connected to the primary device 120 by inserting the secondary device 140 in a connection port 122 in the primary device 120, and is electrically disconnected from the primary device 120 by pulling out the secondary device 140 from the connection port 122. In another example, electrical connection/disconnection between the primary device 120 and the secondary device 140 may be done by attaching/detaching an electrically conductive cable such as a USB cable, for example.

The secondary device 140 is a device for generating aerosol or vapor including a flavor component, by electrically heating an aerosol generating article 160 for smoking. A user, who is a smoker, can inhale aerosol or vapor generated by the secondary device 140. The primary device 120 is a device for supplying electric power to the secondary device 140 in the first use form. In the first use form, the primary device 120 can charge a secondary power source 148 within the secondary device 140. The secondary device can operate by use of the secondary power source 148 therein in the second use form. For example, in the case that a predetermined quantity of electric power in the secondary power source 148 is consumed in the smoking system 100 in the second use form, the form is reverted to the first use form. After returning to the first use form, the secondary device 140 can make the secondary power source 148 to be recharged by accepting supply of electric power from the primary device 120, and, in addition, can directly heat the aerosol generating article 160 by use of electric power supplied from the primary device 120.

As shown in FIG. 1, the secondary device 140 comprises an aerosol generating article holding part 142, a load 144, a driving circuit 146, the secondary power source 148, a user manipulation part 152, a control part 154, and a memory 156. For example, the secondary device 140 is constructed to have a shape and a size that are appropriate for a user to inhale aerosol or vapor. For example, a user may hold the secondary device 140 between fingers of the user and smoke it. For example, the external shape of the secondary device 140 may be approximately cylindrical, that is similar to the shape of a cigarette; however, the shape is not limited to that explained above, and the device may be constructed to have any other shape and size.

The aerosol generating article holding part 142 is a space constructed to be able to hold the aerosol generating article 160. Thus, the aerosol generating article holding part 142 may have a shape corresponding to that of the aerosol generating article 160. For example, the aerosol generating article 160 may comprise a solid aerosol base-material formed to have a cylindrical stick shape having a diameter similar to that of a cigarette. FIG. 1 shows the secondary device 140 in a state that the aerosol generating article 160 constructed as explained above is inserted into the aerosol generating article holding part 142. For example, the aerosol base-material is constructed by processing shredded tobacco or tobacco raw material having a granular form or a powder form, which releases a fragrance inhaling taste component when it is heated, to have a cylindrical shape, and adding thereto an aerosol source in a liquid form. In this regard, in the present embodiment, the aerosol base-material and/or the aerosol source function(s) as a flavor source. As shown in FIG. 1, the aerosol generating article 160 is held by the aerosol generating article holding part 142 in such a manner that an end and a main part, which comprises the aerosol base-material, of the aerosol generating article 160 is housed in the aerosol generating article holding part 142, and the other end of the aerosol generating article 160 extends to the outside of the aerosol generating article holding part 142. A user can perform smoking by holding the end of the aerosol generating article 160, that projects from the aerosol generating article holding part 142, in the user's mouth.

When usability is taken into consideration, it is preferable that the secondary device 140 be constructed to have a shape similar to that of a conventional cigarette. In this regard, there is restriction relating to arrangement of electric components in the inside of the secondary device 140, since the secondary device 140 has the hollow aerosol generating article holding part 142. Thus, it is preferable that the secondary power source 148 be small; so that the capacity thereof is forced to be relatively small. On the other hand, since there is no such restriction in the primary device 120, it is preferable to construct a primary power source 126 to have a capacity sufficiently larger than that of the secondary power source 148, for making the primary power source 126 to be able to charge the secondary power source 148 plural number of times. For example, it is preferable to set that the capacity of the primary power source 126 is 5-40 times larger than the capacity of the secondary power source 148; however, in this regard, the range of ratios between the capacities are not limited thereto. Also, it is preferable that each of the primary power source 126 and the secondary power source 148 be constructed by use of a lithium-ion secondary battery; however, the constructions of the power sources are not limited thereto.

The aerosol generating article 160 and the aerosol generating article holding part 142 may be constructed to have constructions different from those shown in FIG. 1. For example, the aerosol generating article 160 may be an aerosol source which is in the form of a liquid including a flavor component (a flavor source). For example, a liquid aerosol source including a flavor component (a flavor source) is polyol such as glycerin, propylene glycol, or the like in which a nicotine component is included. In the present embodiment, the aerosol source functions as the flavor source. In the case that the aerosol generating article 160 is an aerosol source including a flavor component (a flavor source), the aerosol generating article holding part 142 is constructed by use of fibrous or porous material, such as glass fibers, porous ceramics, or the like, to hold the aerosol source in the form of a liquid by spaces between fibers or in pores in the porous material, for example. Alternatively, the aerosol generating article holding part 142 may be constructed as a tank for storing the liquid. In such a construction, the secondary device 140 additionally comprises a mouthpiece member. A user can inhale generated aerosol or vapor by holding the mouthpiece member in the user's mouth.

The load 144 is a heating element for electrically heating the aerosol generating article 160 held in the aerosol generating article holding part 142. The load 144 is positioned to be in contact with the aerosol generating article 160 or positioned close to the aerosol generating article 160, for making it to be able to heat the aerosol generating article 160. In the second use form wherein the secondary device 140 is disconnected from the primary device 120, the load 144 heats the aerosol generating article 160 by use of electric power supplied from the secondary power source 148 in the secondary device 140. In the first use form wherein the secondary device 140 is connected to the primary device 120, the load 144 heats the aerosol generating article 160 by use of electric power supplied from the primary device 120. In this regard, in the case that the aerosol generating article 160 comprises an aerosol source and an aerosol base-material, aerosol is generated by raising the temperature of the aerosol source by heating the aerosol generating article 160 by the load 144, as explained above. On the other hand, in the case that the aerosol generating article 160 comprises a liquid aerosol source including a flavor component (a flavor source), aerosol may be generated by directly heating the aerosol source by the load 144.

Any arrangement for making the load 144 and the aerosol generating article 160 to be in contact with each other may be used. For example, the load 144 may be arranged in such a manner that the load 144 is exposed on a surface of an inner wall of the aerosol generating article holding part 142. According to the above arrangement, when the aerosol generating article 160 is inserted into the aerosol generating article holding part 142, the outer peripheral surface of the aerosol generating article 160 (for example, a side surface of the cylindrical stick) is made to be in contact with the load 144; thus, the aerosol generating article 160 can be heated from the outer peripheral part. In another example, the load 144 may enter into the aerosol base-material (by plunging the load 144 in the aerosol base-material), when the aerosol generating article 160 is inserted into the aerosol generating article holding part 142. In such a construction, the load 144 can heat the aerosol generating article 160 from the inside thereof. In this regard, it should be reminded that, instead of arranging the load 144 to be in direct contact with the aerosol generating article 160, the load 144 may be arranged in such a manner that it is arranged at a position near the aerosol generating article 160, wherein the position is that sufficiently close to the aerosol generating article 160 so that the aerosol generating article 160 can be heated by the load 144.

The secondary power source 148 is a power source used for driving the secondary device 140 in the second use form. The secondary power source 148 can supply electric power to the load 144 via the driving circuit 146. The remaining charged capacity of the secondary power source 148 decreases when electric power is supplied to the load 144; however, since the secondary power source 148 is charged by the primary device 120 in the first use form, the remaining charged capacity of the secondary power source 148 can be recovered.

The user manipulation part 152 is constructed to accept manipulation with respect to the secondary device 140 by a user. For example, user manipulation with respect to the secondary device 140 includes a start instruction for starting the secondary device 140 and a power supplying instruction for supplying electric power to the load 144. The user manipulation part 152 may comprise a start instructing part for inputting the start instruction and a power supplying instructing part for inputting the power supplying instruction, wherein the above parts are separated from each other; or may comprise a single instruction part which can receive both the start instruction and the power supplying instruction. For example, the user manipulation part 152 is constructed as a button, a switch, a control, a lever, a touch sensor, or the like which can be physically manipulated by a user.

The control part 154 is an electronic circuit module constructed as a microprocessor or a microcomputer, and programmed to control operation of the secondary device 140 in accordance with computer-executable instructions stored in the memory 156. The memory 156 is an information storing medium such as a ROM, a RAM, a flash memory, and so on. The memory 156 stores, in addition to the computer-executable instructions, setting data required for controlling the secondary device 140.

Figure 2:
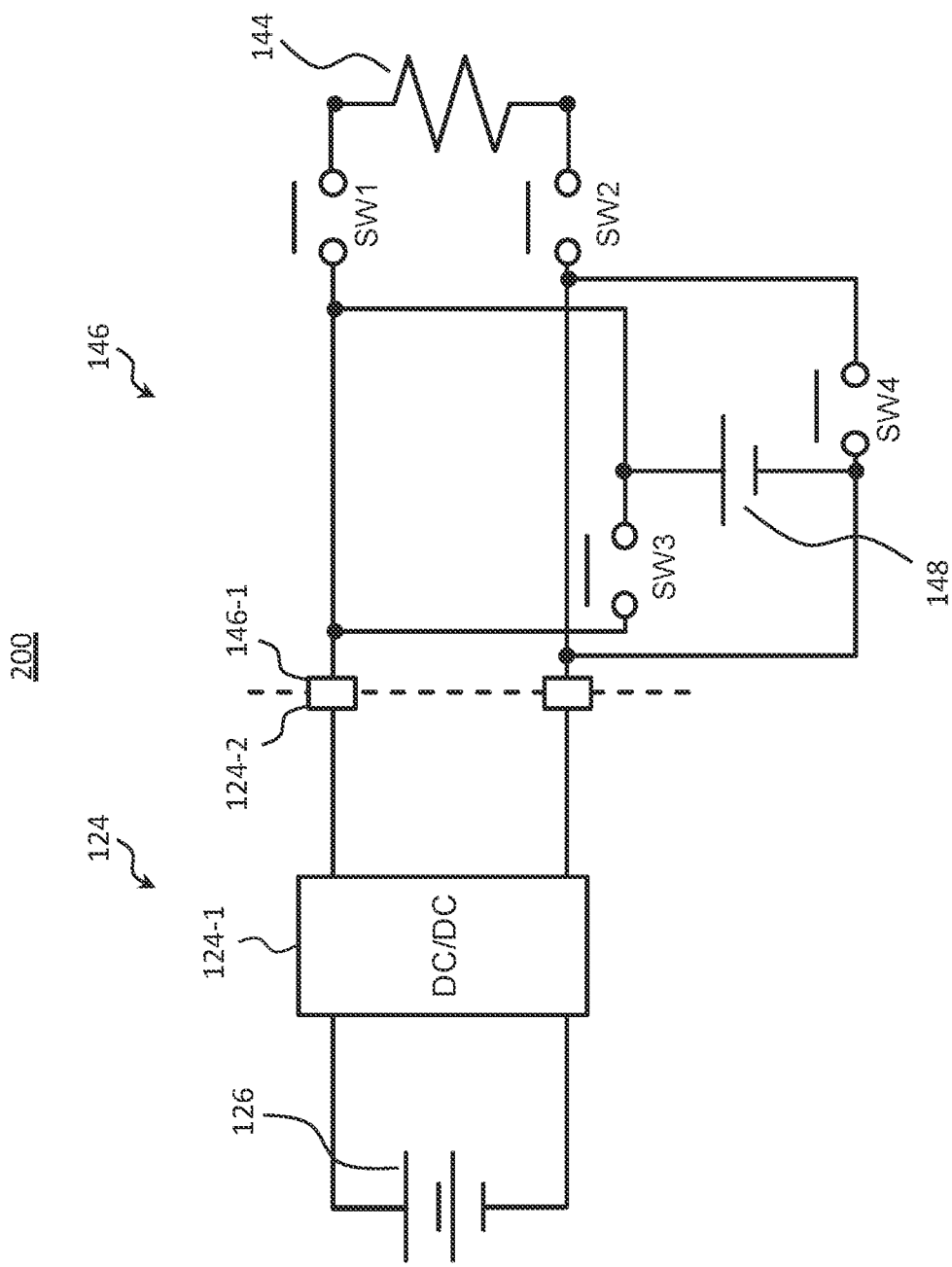
FIG. 2 is an electric circuit diagram of the smoking system 100 according to an embodiment of the present invention.

When FIGS. 1 and 2 are referred to, the primary device 120 comprises the connection port 122, an electric power supplying circuit 124, the primary power source 126, a user manipulation part 132, a control part 134, and a memory 136. The above respective elements in the primary device 120 are included in a main body part 120A of the primary device 120, for example. The primary device 120 further comprises a holding part 120B which is drawn as a lid in FIG. 1. As shown in FIG. 1, the lid 120B is attached to a top part of the main body part 120A by engaging the lid 120B with the main body part 120A by a hinge 120C, so that the main body part 120A can be opened/closed. FIG. 1 shows the primary device 120 in a state that the lid 120B is being opened. In a state that the lid 120B is being closed, the lid 120B holds the secondary device 140 in such a manner that the secondary device 140 inserted into the connection port 122 does not drop from the connection port 122. The lid 120B may be a slide-opening/closing-type lid. Alternatively, instead of constructing the holding part 120B to have the form of a lid, the holding part 120B may be constructed by use of a different member which is able to restrict movement of the secondary device 140 (for example, a construction for engaging a hook with the secondary device 140, a construction using attracting force of a magnet, and so on).

The connection port 122 is a space in which the secondary device 140 is housed in the first use form of the smoking system 100. When the secondary device 140 is inserted into the connection port 122, a connection terminal 146-1 of the secondary device 140 is made to be in contact with a connection terminal 124-2 in the connection port 122 at the primary device 120 side. The connection terminal 146-1 is a terminal which is a part of the deriving circuit 146 of the secondary device 140, and the connection terminal 124-2 is a terminal which is a part of the electric power supplying circuit 124 of the primary device 120. By use of the above terminals, the secondary device 140 is electrically connected to the primary device 120.

The primary power source 126 is a power source used for supplying electric power to the secondary device 140 in the first use form. In the case that the smoking system 100 is driven in a charging mode, that will be explained later, in the first use form, the primary power source 126 charges the secondary power source 148 in the secondary device 140 via the electric power supplying circuit 124 and the driving circuit 146. Also, in the case that the smoking system 100 is driven in a direct heating mode, that will be explained later, in the first use form, the primary power source 126 can supply electric power to the load 144 in the secondary device 140 via the electric power supplying circuit 124 and the driving circuit 146. Thus, right after the secondary device 140 is inserted into the connection port 122, so that without necessity to wait recovery of the remaining charged capacity of the secondary power source 148 in the secondary device 140, the load 144 in the secondary device 140 can heat the aerosol generating article 160 by receiving electric power from the primary power source 126. Although the remaining charged capacity of the primary power source 126 decreases if electric power is supplied to the secondary device 140, the remaining charged capacity of the primary power source 126 can be recovered by charging it by an external charger (which is not shown in the figure) via an external connection terminal (which is not shown in the figure).

The user manipulation part 132 is constructed in such a manner that it can accept manipulation with respect to the primary device 120 by a user. User manipulation with respect to the primary device 120 includes a driving instruction for allowing supply of electric power to the secondary device 140, for example. For example, the user manipulation part 132 is constructed as a button, a switch, a control, a lever, a touch sensor, or the like which can be physically manipulated by a user.

The control part 134 is an electronic circuit module constructed as a microprocessor or a microcomputer, and programmed to control operation of the primary device 120 in accordance with computer-executable instructions stored in the memory 136. The memory 136 is an information storing medium such as a ROM, a RAM, a flash memory, and so on. The memory 156 stores, in addition to the computer-executable instructions, setting data required for controlling the primary device 120.

FIG. 2 is an electric circuit diagram of the smoking system 100 according to an embodiment of the present invention. As shown in FIG. 2, an electric circuit 200 in the smoking system 100 comprises an electric power supplying circuit 124 in the primary device 120 and a driving circuit 146 in the secondary device 140. The electric power supplying circuit 124 in the primary device 120 comprises a DC/DC converter 124-1 and a connection terminal 124-2. The DC/DC converter 124-1 boosts and/or steps down a voltage of the primary power source 126 in accordance with control by a control part (the control part 134 in the primary device 120 or the control part 154 in the secondary device 140) for adjusting an output voltage of the primary device 120. On the other hand, in general, since a DC/DC converter has a voltage controlling mode for controlling an output voltage and a current (electric power) mode for controlling output current (electric power), the DC/DC converter 124-1 may adjust output current (electric power) of the primary device 120. The driving circuit 146 in the secondary device 140 comprises a first switch SW1, a second switch SW2, a third switch SW3, a fourth switch SW4, and a connection terminal 146-1. Each of the switches SW1, SW2, SW3, and SW4 is an electric switch such as a transistor or the like, for example; and each switch is controlled individually by the control part (the control part 154 in the secondary device 140 and/or the control part 134 in the primary device 120) to be switched between an ON state and an OFF state. The electric circuit 200 is constructed by making the secondary device 140 inserted into the connection port 122 of the primary device 120 to be electrically connected to the primary device 120, via the connection terminal 146-1 at the secondary device 140 side and the connection terminal 124-2 at the primary device 120 side.

FIG. 3 shows state transitions 300 in the electric circuit 200 with respect to plural operation modes in the smoking system 100 according to an embodiment of the present invention. The smoking system 100 can be operated in four modes, specifically, a normal smoking mode, a normal non-smoking mode, a charging mode, and a direct heating mode. The normal smoking mode is a mode wherein the secondary device 140 is electrically disconnected from the primary device 120 and operated independently for allowing a smoking action. The normal non-smoking mode is a mode wherein smoking is stopped while the secondary device 140 is being separated from the primary device 120. The charging mode is a mode wherein the secondary device 140 is connected to the primary device 120, and the secondary power source 148 in the secondary device 140 is charged by the primary power source 126 in the primary device 120. The direct heating mode is a mode wherein the secondary device 140 is connected to the primary device 120, and electric power is directly supplied from the primary power source 126 in the primary device 120 to the load 144 in the secondary device 140 for allowing a smoking action. The normal smoking mode and the normal non-smoking mode correspond to those in the second use form, and the charging mode and the direct heating mode correspond to those in the first use form.

As shown in FIG. 3, in the normal smoking mode, the control part sets each of the first switch SW1, the second switch SW2, and the fourth switch SW4 to an ON state, and sets the third switch SW3 to an OFF state. As a result, electric power is supplied from the secondary power source 148 in the secondary device 140 to the load 144, and the aerosol generating article 160 is heated by the load 144. Accordingly, a user can perform a smoking action in the second use form. In the normal non-smoking mode, the control part sets each of all switches SW1, SW2, SW3, and SW4 to an OFF state. As a result, supply of electric power to the load 144 is blocked, and the heating process of the aerosol generating article 160 is stopped. In the charging mode, the control part sets the third switch SW3 to an ON state, and sets each of the first switch SW1, the second switch SW2, and the fourth switch SW4 to an OFF state. As a result, electric power is supplied from the primary power source 126 in the primary device 120 to the secondary power source 148 in the secondary device 140, and the secondary power source 148 is charged thereby. On the other hand, in the direct heating mode, the control part sets each of the first switch SW1 and the second switch SW2 to an ON state, and sets each of the third switch SW3 and the fourth switch SW4 to an OFF state. As a result, electric power is directly supplied from the primary power source 126 in the primary device 120 to the load 144, and the aerosol generating article 160 is heated by the load 144. Thus, a user can perform a smoking action in the first use form, also.

As explained above, the smoking system 100 can perform switching between operation modes, by controlling an ON state and an OFF stare of each switch included in the driving circuit 146 in the secondary device 140. Further, the smoking system 100 is constructed in such a manner that, in the first use form wherein the secondary device 140 is being connected to the primary device 120, and in the case that the mode is switched between the charging mode and the direct heating mode, a transition mode is executed between the above two modes, instead of immediately changing the charging mode to the direct heating mode and instead of immediately changing the direct heating mode to the charging mode. That is, regarding switching between operation modes of the smoking system 100 in the first use form, the charging mode is changed to the direct heating mode via the transition mode, and the direct heating mode is changed to the charging mode via the transition mode. The transition mode may be interposed in both transition directions, i.e., the transition from the charging mode to the direct heating mode and the transition from the direct heating mode to the charging mode, or the transition mode may be interposed in one of the two transition directions.

The transition mode is a mode wherein a process for changing a variable relating to supply of electric power from the primary device 120 to the secondary device 140 is performed. In a non-limiting example, the variable relating to supply of electric power includes a quantity of electric power suppled from the primary device 120 to the secondary device 140 (that is, a discharge rate of the primary power source 126 in the primary device 120). For example, since it is preferable to determine an appropriate quantity (rate) of supplied electric power according to characteristics and use of an object to which electric power is to be supplied, the quantity of electric power supplied from the primary device 120 to the secondary device 140 in the charging mode is different from the quantity of electric power supplied from the primary device 120 to the secondary device 140 in the direct heating mode.

For example, although there may be differences between lithium-ion secondary batteries in terms of materials and constructions of electrodes, electrolytic solutions, active materials, conductive additives, and so on, there is a characteristic that a lithium-ion secondary battery has rate dependency, in the case that a lithium-ion secondary battery is used as the secondary power source 148 in the secondary device 140. The rate dependency is correlation between the magnitude of a charging rate or a discharging date and the effect thereof on deterioration of the lithium-ion secondary battery. In this example, deterioration of the lithium-ion secondary battery is represented by a ratio of the present chargeable capacity or the present dischargeable capacity of the battery to the chargeable capacity or the dischargeable capacity when the battery is new (at the time of shipment from the factory), for example. In a general trend, effect on degradation of a lithium-ion secondary battery increases acceleratingly as the rate becomes large. Also, even in the same rate, the effect, due to charging, on degradation is 2-3 times lager than the effect, due to discharging, on degradation. Thus, it is preferable that the value of the quantity of electric power supplied from the primary device 120 to the secondary device 140 in the charging mode be controlled in such a manner that the value is set to be relatively small for suppressing degradation of the secondary power source 140 which is to be charged.

On the other hand, in the direct heating mode, since electric power is mainly supplied from the primary power source 126 to the load 144, restriction such as that explained above, i.e., restriction that is applied by taking suppression of deterioration of the secondary power source 140 into consideration, does not exist. Rather, since it is necessary to heat the aerosol generating article 160 to have temperature that is sufficient for generating aerosol, it is preferable that the value of the quantity of electric power supplied from the primary device 120 to the secondary device 140 in the direct heating mode be controlled in such a manner that the value is set to be relatively large. As a result of more detailed study, it is found that, in the case that a lithium-ion secondary battery is also used as the primary power source 126 in the primary device 120 and if the value of the quantity of electric power supplied from the primary device 120 to the secondary device 140 is controlled to be large, it is necessary to consider whether the primary power source 126 degrades due to its rate dependency. In this regard, it should be reminded that it is preferable that the primary power source 126 has a capacity sufficiently larger than that of the secondary power source 148 for making it to be able to charge the secondary power source 148 plural number of times; however, in general, the rate becomes smaller as the capacity of the secondary battery becomes larger, as widely known. Further, although the primary power source 126 discharges toward the secondary device 140, the effect, due to discharging, on deterioration is smaller than the effect, due to charging, on deterioration, as explained above. Thus, even if the value of the quantity of supply of electric power from the primary device 120 to the secondary device 140 is controlled to be large, deterioration of the primary power source 126 can be sufficiently suppressed if the value is adjusted to be that in an appropriate range of values.

For filling a gap between the quantities of electric power supplied from the primary device 120 to the secondary device 140 in the charging mode and the direct heating mode, the smoking system 100 in the transition mode performs a process for changing the quantity of electric power supplied from the primary device 120 to the secondary device 140 from the quantity of electric power supplied in the operation mode before switching operation (i.e., in one of the charging mode and the direct heating mode) to the quantity of electric power supplied in the operation mode after switching operation (i.e., in the other of the charging mode and the direct heating mode). Changing of the quantity of supplied electric power is realized by controlling the output voltage or the output current (electric power) from the DC/DC converter 124-1 in the primary device 120, for example. By making the smoking system 100 to perform the process for changing the quantity of electric power supplied in the transition mode as explained above, switching between the charging mode and the direct heating mode in the first use form can be performed smoothly.

The length of duration of the transition mode (hereinafter, the "transition time") may be set to one of various values. For example, regarding the transition time in the case that the operation mode is switched from the direct heating mode to the charging mode, it may simply be set to a length of time that is required for changing, by the DC/DC converter 124-1 in the primary device 120, the output voltage or the output current (electric power). The length of time depends only on electrical processing in the DC/DC converter 124-1, and it may be less than one second, typically. Also, for example, in the case that the operation mode is switched from the charging mode to the direct heating mode, the transition mode may be extended after the voltage is changed by the DC/DC converter 124-1, until the aerosol generating article 160 is inserted into the aerosol generating article holding part 142 by a user for preparation to start a smoking action. The transition time in the above case is typically longer than one second, and may be several seconds to several tens of seconds, since it is necessary to wait for artificial manipulation by a user.

Figure 4A:
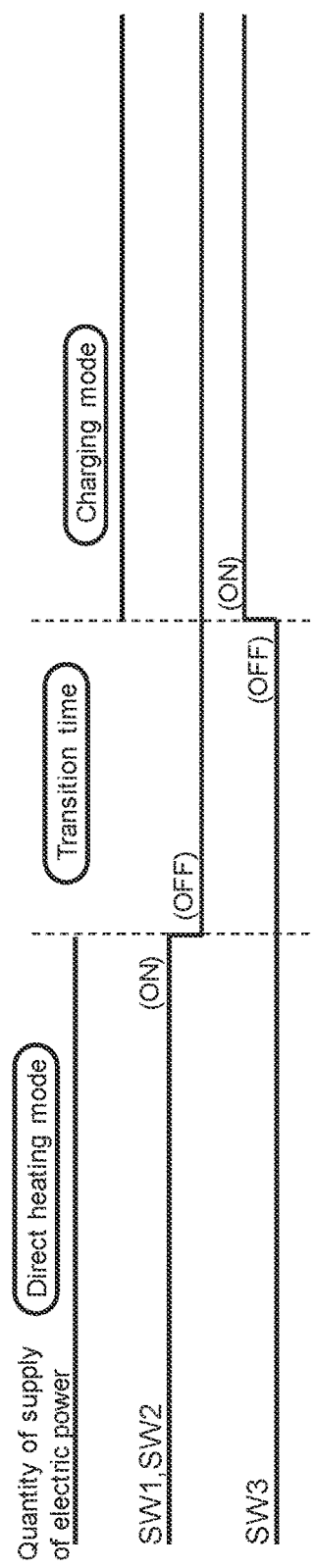
FIG. 4A is an example of a timing chart showing transitions of states of the smoking system 100 when a direct heating mode is switched to a charging mode.

FIG. 4A is a timing chart showing an example of transition between states of the smoking system 100 when the direct heating mode is switched to the charging mode. When FIG. 4A is referred to, the smoking system 100 operates in the direct heating mode, initially. As explained above, in the direct heating mode, the control part sets each of the first switch SW1 and the second switch SW2 to an ON state, and sets each of the third switch SW3 and the fourth switch SW4 to an OFF state in the driving circuit 146 in the secondary device 140. Further, by controlling the DC/DC converter 124-1 in the electric power supplying circuit 124 in the primary device 120, the control part adjusts electric power to be supplied from the primary device 120 to the load 144 in the secondary device 140 in such a manner that the aerosol generating article 160 is heated to raise its temperature to predetermined target temperature or to keep its temperature at the predetermined target temperature.

Next, the smoking system 100 changes its mode to the transition mode, at the time that a triggering event, for example, an event that a predetermined user manipulation is inputted to the user manipulation part 132 or 152, has occurred. For example, a user inputs, via the user manipulation part 132 or 152, an instruction for switching the mode of the smoking system 100 from the direct heating mode to the charging mode. When the control part has received such a user manipulation, the control part changes the state of each of the first switch SW1 and the second switch SW2 from an ON state to an OFF state, and, at the same time, maintains an OFF state of the third switch SW3 in the driving circuit 146 in the secondary device 140, and changes the mode of the smoking system 100 to the transition mode thereby. Also, in the transition mode, the control part controls the DC/DC converter 124-1 in the primary device 120 to change the quantity of electric power supplied from the primary device 120 to the secondary device 140 from the quantity of electric power supplied in the direct heating mode to the quantity of electric power supplied in the charging mode. As explained above, in general, the maximum quantity (charging rate) of electric power allowed to be supplied when charging a rechargeable battery (the secondary power source 148) is smaller than the quantity of electric power required for a heating process by a heater (the load 144). In the case that a charging process using a rate larger than the maximum allowed rate is performed, there is a risk that performance of the secondary power source 148 is degraded. Thus, the control part controls the DC/DC converter 124-1 in such a manner that the electric power supplied from the primary device 120 is reduced from the quantity of electric power supplied in the direct heating mode, that is high, to the quantity of electric power supplied in the charging mode, that is low. It takes finite time (for example, less than one second) to reduce the quantity of supplied electric power to the intended quantity; however, since the third switch SW3 in the driving circuit 146 in the secondary device 140 has been set to an OFF state in the transition mode shown in FIG. 4A, charging of the secondary power source 148 in the secondary device 140 by a relatively large quantity of electric power, that corresponds to the quantity before completely reduced to the quantity of electric power supplied in the charging mode, can be prevented. Further, since time required for reducing the quantity of supplied electric power to the quantity, that is low, of electric power supplied in the charging mode is short, quick switching from the direct heating mode to the charging mode can be realized, substantially.

After the transition time having a predetermined length of time has elapsed, the mode of the smoking system 100 is changed from the transition mode to the charging mode. In the charging mode, the control part keeps an OFF state, that has been set in the transition mode, of each of the first switch SW1 and the second switch SW2, and changes the state of the third switch SW3 from an OFF state to an ON state in the driving circuit 146 in the secondary device 140. As a result, a lower quantity of electric power, that is set to be supplied in the charging mode, is supplied from the primary device 120 to the secondary power source 148 in the secondary device 140, and the secondary power source 148 is charged thereby. In this regard, it should be reminded that, in the sequence of transition from the direct heating mode to the charging mode via the transition mode, the fourth switch SW4 is controlled to be in a OFF state continuously.

Figure 4B:
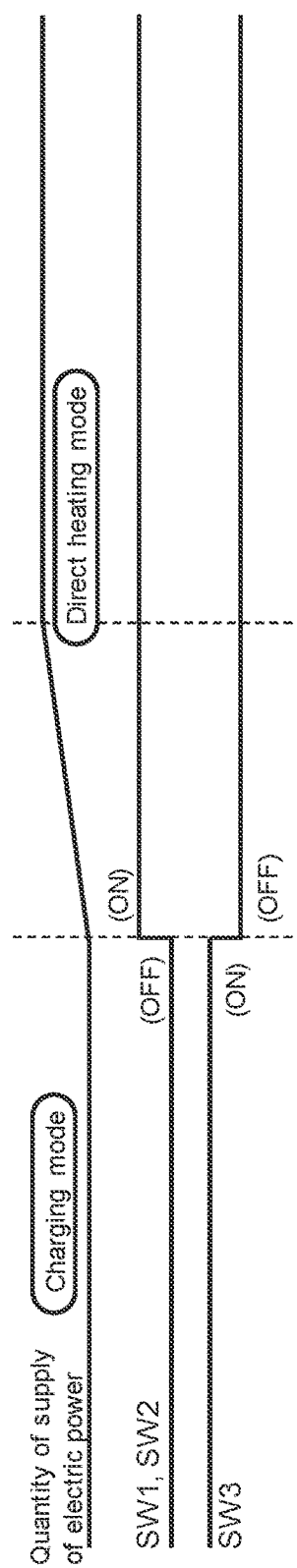
FIG. 4B is an example of a timing chart showing transitions of states of the smoking system 100 when the charging mode is switched to the direct heating mode.

FIG. 4B is a timing chart showing an example of transition between states of the smoking system 100 when the charging mode is switched to the direct heating mode. When FIG. 4B is referred to, the smoking system 100 operates in the charging mode, initially. As explained above, in the charging mode, the control part sets each of the first switch SW1 and the second switch SW2 to an OFF state, and sets the third switch SW3 to an ON state in the driving circuit 146 in the secondary device 140. Also, the control part adjusts the value of the quantity of electric power supplied from the primary device 120 to the secondary power source 148 in the secondary device 140 to a predetermined low value, by controlling the DC/DC converter 124-1 in the electric power supplying circuit 124 in the primary device 120.

Next, the smoking system 100 changes its mode to the transition mode, at the time that a triggering event, for example, an event that a predetermined user manipulation is inputted to the user manipulation part 132 or 152, has occurred. For example, a user inputs, via the user manipulation part 132 or 152, an instruction for switching the mode of the smoking system 100 from the charging mode to the direct heating mode. When the control part has received such a user manipulation, the control part changes the state of each of the first switch SW1 and the second switch SW2 from an OFF state to an ON state, and, at the same time, changes the state of the third switch SW3 from an ON state to an OFF state in the driving circuit 146 in the secondary device 140, and changes the mode of the smoking system 100 to the transition mode thereby. Also, in the transition mode, the control part controls the DC/DC converter 124-1 in the primary device 120 to change the quantity of electric power supplied from the primary device 120 to the secondary device 140 from the quantity of electric power supplied in the charging mode, that is low, to the quantity of electric power supplied in the direct heating mode, that is high (for example, as shown in FIG. 4B, the quantity is gradually increased from the quantity of electric power supplied in the charging mode, that is low, to the quantity of electric power supplied in the directly heating mode, that is high). Unlike the case in FIG. 4A, there is no specific restriction relating to the quantity of electric power to be supplied to the load 144 in the direct heating mode, that is the mode after the switching process; thus, the state of each of the first switch SW1 and the second switch SW2 is set to an ON state in the transition mode in FIG. 4B. As a result, supply of electric power from the primary device 120 to the load 144 in the secondary device 140 is started in the transition mode, thus, the aerosol generating article 160 can be heated quickly. In this regard, it should be reminded that, in the sequence of transition from the charging mode to the direct heating mode via the transition mode, the fourth switch SW4 is controlled to be in a OFF state continuously.

FIG. 4C is a timing chart showing another example of transition between states of the smoking system 100 when the direct heating mode is switched to the charging mode. The timing chart shown in FIG. 4C is different from the timing chart shown in FIG. 4A only in the point that each of the first switch SW1 and the second switch SW2 is set to an ON state in the transition mode. The control part, which has received a predetermined user manipulation in the direct heating mode, maintains an ON state of each of the first switch SW1 and the second switch SW2 and an OFF state of the third switch SW3 in the driving circuit 146 in the secondary device 140, and changes the mode of the smoking system 100 to the transition mode thereby. In the transition mode, the control part controls the DC/DC converter 124-1 in the primary device 120 to gradually decrease the quantity of electric power supplied from the primary device 120 to the secondary device 140 from the quantity of electric power supplied in the direct heating mode, that is high, to the quantity of electric power supplied in the charging mode, that is low.

In the smoking system 100 having a construction that the load 144 in the secondary device 140 is made to be in contact with the aerosol generating article 160 physically, a component of the aerosol generating article 160 may remain on the surface of the load 144, after a user has completed a smoking action and the aerosol generating article 160 has been removed from the aerosol generating article holding part 142. If the residual component is left as it is, there may be a risk that reliability and heating ability of the load 144 is adversely affect thereby. In the transition mode shown in FIG. 4C, since each of the first switch SW1 and the second switch SW2 in the driving circuit 146 in the secondary device 140 is set to an ON state, heating by the load 144 is continued even if the direct heating mode is terminated. As a result, the component of the aerosol generating article 160 remaining on the surface of the load 144 is transpired, and, thus, the load 144 is cleaned thereby.

The length of the transition time for continuing the transition mode may be set to a predetermined length of time that is assumed to be required for sufficiently and effectively cleaning the load 144, for example. After the transition time having such a predetermined length of time has elapsed, the smoking system 100 changes its mode from the transition mode to the charging mode. In the charging mode, the control part changes the state of each of the first switch SW1 and the second switch SW2 from an ON state to an OFF state, and, at the same time, changes the state of the third switch SW3 from an OFF state to an ON state. As a result, charging from the primary device 120 to the secondary power source 148 in the secondary device 140 is performed. In this regard, it should be reminded that, in the sequence of transition from the direct heating mode to the charging mode via the transition mode, the fourth switch SW4 is controlled to be in a OFF state continuously.

FIG. 4D is a timing chart showing an example of transition between states of the smoking system 100 when the charging mode is switched to the direct heating mode. The timing chart shown in FIG. 4D is different from the timing chart shown in FIG. 4B in the point that each of the first switch SW1 and the second switch SW2 is set to an OFF state in the transition mode. The control part, which has received a predetermined user manipulation in the charging mode, maintains an OFF state, that is the same as the state in the charging mode, of each of the first switch SW1 and the second switch SW2, and, at the same time, changes the state of the third switch SW3 from an ON state to an OFF state in the driving circuit 146 in the secondary device 140, and changes the mode of the smoking system 100 to the transition mode thereby. In the transition mode, the control part controls the DC/DC converter 124-1 in the primary device 120 to change the quantity of electric power supplied from the primary device 120 to the secondary device 140 from the quantity of electric power supplied in the charging mode, that is low, to the quantity of electric power supplied in the direct heating mode, that is high. However, unlike the case shown in FIG. 4B, supply of electric power to the load 144 is suspended, since each of the first switch SW1 and the second switch SW2 is in an OFF state. For example, right after switching from the charging mode to the transition mode, there may be a case that the aerosol generating article 160 has not yet attached to the aerosol generating article holding part 142. In such a case, heating of the load 144, without an object to be heated by the load 144, can be prevented, since supply of electric power to the load 144 is suspended.

In the example shown in FIG. 4D, the transition mode may be continued until the aerosol generating article 160 is attached to the aerosol generating article holding part 142, for example. Alternatively, the duration of the transition mode may be set independently from attaching of the aerosol generating article 160 to the aerosol generating article holding part 142. In other words, the transition mode may be continued from a point in time before the aerosol generating article 160 is attached to the aerosol generating article holding part 142 to a point in time after the aerosol generating article 160 is attached to the aerosol generating article holding part 142. For example, the transition mode may be continued until a process for obtaining or estimating the state of charging of the secondary power source 148 in the secondary device 140 is completed. The control part changes the state of each of the first switch SW1 and the second switch SW2 from an OFF state to an ON state, and, at the same time, maintains an OFF state of the third switch SW3, after detecting the state that the aerosol generating article 160 has been attached to the aerosol generating article holding part 142. As a result, the smoking system 100 changes its mode from the transition mode to the direct heating mode, and electric power is supplied from the primary device 120 to the load 144 in the secondary device 140. In this regard, it should be reminded that, in the sequence of transition from the charging mode to the direct heating mode via the transition mode, the fourth switch SW4 is controlled to be in a OFF state continuously.

Figure 5:
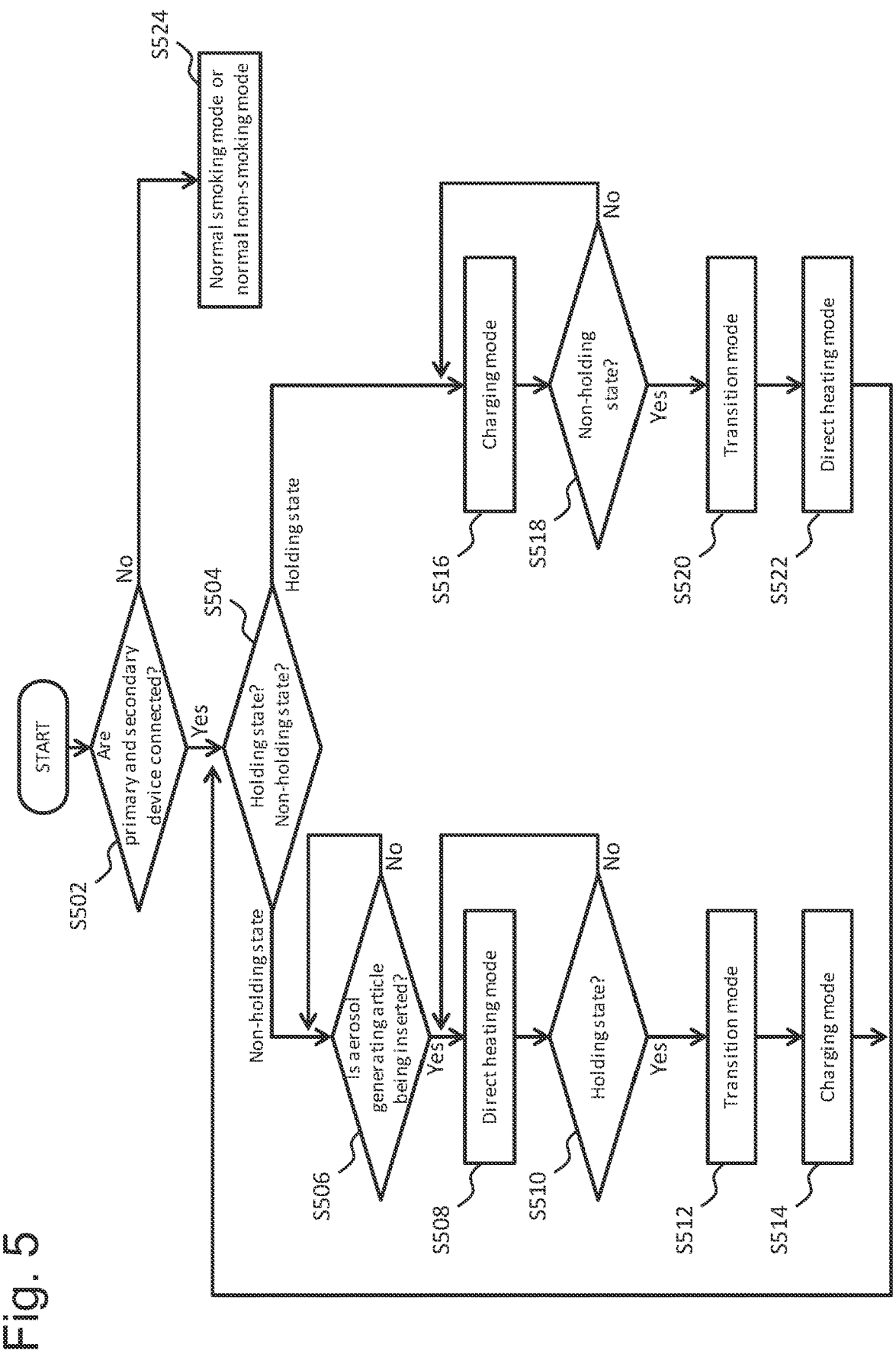
FIG. 5 is a flow chart showing an example process 500 for making a control part (a control part 134 and/or a control part 154) in the smoking system 100 according to an embodiment of the present invention to perform control for switching between operation modes of the smoking system 100.

FIG. 5 is a flow chart showing an example process 500 for making the control part (the control part 134 and/or the control part 154) in the smoking system 100 according to an embodiment of the present invention to perform control for switching between operation modes of the smoking system 100. The process 500 starts in the first use form, wherein the secondary device 140 is connected to the primary device 120, or in the second use form, wherein the secondary device 140 is disconnected from the primary device 120.

When the process 500 is started, the control part first judges whether the secondary device 140 is connected to the primary device 120, in step S502. For example, the control part can judge whether the secondary device 140 is inserted into the connection port 122 in the primary device 120, that is, whether the secondary device 140 is connected to the primary device 120, by detecting electric contact between the connection terminal 146-1 of the secondary device 140 and the connection terminal 124-2 of the primary device 120. The process 500 proceeds to step S504 if the secondary device 140 has been connected to the primary device 120, and to step S524 if they are not connected.

If the secondary device 140 has been connected to the primary device 120, that is, if the smoking system 100 is in the first use form, the control part judges whether the holding part 120B in the primary device 120 is in a holding state or a non-holding state, in step S504. The holding state of the holding part 120B is a state wherein the holding part 120B holds the secondary device 140 in such a manner that electrical connection between the primary device 120 and the secondary device 140 inserted into the connection port 122 is maintained. On the other hand, the non-holding state of the holding part 120B is a state wherein the holding part 120B does not hold the secondary device 140 inserted into the connection port 122, thus, electrical connection between the primary device 120 and the secondary device 140 can be released. For example, in the construction that the holding part 120B is a lid, a state that the lid is being closed is the holding state, and a state that the lid is being opened is the non-holding state. For example, the control part can judge whether the holding part 120B is in the holding state or the non-holding state, based on a signal from a mechanical switch which is operated in relation to movement of the holding part 120B. Alternatively, the primary device 120 may be constructed in such a manner that the lid 120B automatically opens when a main power source button is manipulated to turn on, and the lid 120B automatically closes when the main power source button is manipulated to turn off. The process 500 proceeds to step S506 if the holding part 120B is in the non-holding state, and proceeds to step S516 if the holding part 120B is in the holding state. The lid 120B may be a slide-opening/closing-type lid. Alternatively, instead of constructing the holding part 120B to have the form of a lid, the holding part 120B may be constructed by use of a different member which is able to restrict movement of the secondary device 140 (for example, a construction for engaging a hook with the secondary device 140, a construction using attracting force of a magnet, and so on).

If the holding part 120B in the primary device 120 is in the non-holding state, the control part judges whether the aerosol generating article 160 is inserted into the aerosol generating article holding part 142 in the secondary device 140, in step S506. For example, the secondary device 140 comprises a mechanical switch which is pushed by the aerosol generating article 160 when the aerosol generating article 160 is inserted into the aerosol generating article holding part 142. The mechanical switch supplies, to the control part, an electric signal that represents a state that it is being pushed by the aerosol generating article 160. Based on the signal, the control part can judge whether the aerosol generating article 160 is being inserted into the aerosol generating article holding part 142. The process 500 proceeds to step S508 if the aerosol generating article 160 is being inserted into the aerosol generating article holding part 142, and the process 500 repeats step S506 if the aerosol generating article 160 is not inserted. In the present embodiment, if it is judged in step S506 that the aerosol generating article 160 is being inserted into the aerosol generating article holding part 142 in the secondary device 140, the direct heating mode is executed in step S508. In addition, in a point between step S506 and step S508, it is possible to judge whether a sufficient capacity of the aerosol generating article 160, which has been inserted into the aerosol generating article holding part 142, remains. If a sufficient capacity of the aerosol generating article 160 does not remain, a sufficient quantity of aerosol cannot be generated even if the direct heating mode is executed in step S508; thus, it may be constructed in such a manner that, in such a case, the direct heating mode is not executed, or the direct heating mode is stopped when the remained capacity of the aerosol generating article 160 is completely consumed.

In step S508, the control part performs control for operating the smoking system 100 in the direct heating mode. More specifically, as explained above, the control part sets the state of each of the first switch SW1 and the second switch SW2 to an ON state, and sets the state of the third switch SW3 to an OFF state in the driving circuit 146 in the secondary device 140. Further, by controlling the DC/DC converter 124-1 in the electric power supplying circuit 124 in the primary device 120, the control part adjusts electric power to be supplied from the primary device 120 to the load 144 in the secondary device 140 in such a manner that the aerosol generating article 160 is heated to raise its temperature to predetermined target temperature or to keep its temperature at the predetermined target temperature. Above-explained step S508 corresponds to the direct heating mode shown in the timing chart in each of FIGS. 4A and 4C, that is first executed when the operation of the smoking system 100 is switched from the direct heating mode to the charging mode. As a result that electric power is supplied from the primary device 120 to the load 144 in the secondary device 140 in step S508, a user can perform a smoking action while the first use form, in which the secondary device 140 is being connected to the primary device 120, is maintained.

Next, in step S510, the control part judges whether the state of the holding part 120B in the primary device 120 is changed from the non-holding state to the holding state (for example, whether the lid 120B is closed). For example, a user can give, to the smoking system 100, an instruction for changing the operation mode of the smoking system 100 from the direct heating mode to the charging mode, by changing the state of the holding part 120B from the non-holding state to the holding state (for example, performing a manipulation for closing the lid 120B). The process 500 proceeds to step S512 if the state of the holding part 120B is changed to the holding state, and returns to step S508 if the non-holding state is kept.

In this regard, it should be reminded that, in step S510, it may be possible to perform a process for judging whether the aerosol generating article 160 is removed from the aerosol generating article holding part 142, in place of the process for judging whether the state of the holding part 120B is changed from the non-holding state to the holding state. In such an example, the process 500 proceeds to step S512 if the aerosol generating article 160 is removed from the aerosol generating article holding part 142, and returns to step S508 if the aerosol generating article 160 is being inserted into the aerosol generating article holding part 142.

After the state of the holding part 120B is changed to the holding state, the control part performs control for changing the mode of the smoking system. 100 from the direct heating mode to the transition mode in step S512. For example, the control part changes the state of each of the first switch SW1 and the second switch SW2 from an ON state to an OFF state, and maintains an OFF state of the third switch SW3 in the driving circuit 146 in the secondary device 140. Further, the control part controls the DC/DC converter 124-1 in the primary device 120 to change the quantity of electric power supplied from the primary device 120 to the secondary device 140 from the quantity of electric power supplied in the direct heating mode, that is high, to the quantity of electric power supplied in the charging mode, that is low. The above control corresponds to the control performed in the transition mode in the timing chart shown in FIG. 4A. By performing such control in the transition mode, it becomes possible to prevent charging of the secondary power source 148 in the secondary device 140 by a large quantity of electric power. Alternatively, the control part may maintain an ON state of each of the first switch SW1 and the second switch SW2 and an OFF state of the third switch SW3 in the driving circuit 146 in the secondary device 140, and gradually decreases the quantity of electric power supplied from the primary device 120 to the secondary device 140 from the quantity of electric power supplied in the direct heating mode, that is high, to the quantity of electric power supplied in the charging mode, that is low. The above control corresponds to the control performed in the transition mode in the timing chart shown in FIG. 4C. By performing such control in the transition mode, it becomes possible to prevent charging of the secondary power source 148 in the secondary device 140 by a large quantity of electric power, and it becomes possible to clean the load 144.

In this regard, for improving effect of cleaning with respect to the load 144, it may be possible to judge, while cleaning is being performed, whether the aerosol generating article 160 is certainly removed from the aerosol generating article holding part 142. For example, the control part may judge, based on a temperature rising rate of the load 144 when electric power is being supplied to the load 144 in the transition mode, whether the aerosol generating article 160 has been removed from the aerosol generating article holding part 142. The heat capacity in the state that the aerosol generating article 160 has been attached to the aerosol generating article holding part 142 is larger than the heat capacity in the state that the aerosol generating article 160 has been removed from the aerosol generating article holding part 142; thus, the temperature rising rate of the load 144 when the same quantity of current or electric power is supplied to the load 144 is low in the former state. By using such a characteristic, it becomes possible to precisely judge whether the aerosol generating article 160 is certainly removed from the aerosol generating article holding part 142 while cleaning is being performed, even if a dedicated sensor is not used. In another example, the control part may provides a user with notice that prompts a user to remove the aerosol generating article 160 from the aerosol generating article holding part 142, in the case that it is judged that the aerosol generating article 160 is being attached to the aerosol generating article holding part 142 while cleaning is being performed. Also, when providing the notice, it may be possible to stop cleaning of the load 144.

For example, after a predetermined length of transition time has elapsed after changing the mode of the smoking system 100 to the transition mode, the control part performs control for changing the mode of the smoking system 100 from the transition mode to the charging mode, in step S514. As a result, a user can make the secondary power source 148 in the secondary device 140 to be charged by use of the primary device 120. Step S514 corresponds to the charging mode, that is executed after switching the mode, in the timing chart in each of FIGS. 4A and 4C. Thereafter, the process 500 returns to step S504.

On the other hand, if the result of judgment in step S504 shows that the holding part 120B in the primary device 120 is in the holding state, the control part performs control for making the smoking system 100 to operate in the charging mode, in step S516. More specifically, as explained above, the control part sets the state of each of the first switch SW1 and the second switch SW2 to an OFF state, and sets the state of the third switch SW3 to an ON state. Also, the control part controls the DC/DC converter 124-1 in the power supplying circuit 124 in the primary device 120 to adjust the quantity of electric power supplied from the primary device 120 to the secondary device 140 to have a predetermined low value. Above step S516 corresponds to the charging mode shown in the timing chart in each of FIGS. 4B and 4D, that is first executed when the operation of the smoking system 100 is switched from the charging mode to the direct heating mode.

Next, in step S518, the control part judges whether the state of the holding part 120B in the primary device 120 is changed from the holding state to the non-holding state (for example, whether the lid 120B is opened). For example, a user can give, to the smoking system 100, an instruction for changing the operation mode of the smoking system 100 from the charging mode to the direct heating mode, by changing the state of the holding part 120B from the holding state to the non-holding state (for example, performing a manipulation for opening the lid 120B). The process 500 proceeds to step S520 if the state of the holding part 120B is changed to the non-holding state, and returns to step S516 if the holding state is kept.

After the state of the holding part 120B is changed to the non-holding state, the control part performs control for changing the mode of the smoking system 100 from the charging mode to the transition mode in step S520. For example, the control part changes the state of each of the first switch SW1 and the second switch SW2 from an OFF state to an ON state, and, at the same time, changes the state of the third switch SW3 from an ON state to an OFF stare, in the driving circuit 146 in the secondary device 140. Further, the control part controls the DC/DC converter 124-1 in the primary device 120 to change the quantity of electric power supplied from the primary device 120 to the secondary device 140 from the quantity of electric power supplied in the charging mode, that is low, to the quantity of electric power supplied in the direct heating mode, that is high. The above control corresponds to the control performed in the transition mode in the timing chart shown in FIG. 4B. By performing such control in the transition mode, it becomes possible to quickly heat the aerosol generating article 160.

For example, after a predetermined length of transition time has elapsed after changing the mode of the smoking system 100 to the transition mode, the control part performs control for changing the mode of the smoking system 100 from the transition mode to the direct heating mode, in step S522. Step S522 corresponds to the direct heating mode, that is executed after switching the mode, in the timing chart in FIG. 4B. In step S522, a user can perform a smoking action while the first use form, in which the secondary device 140 is being connected to the primary device 120, is maintained, Thereafter, the process 500 returns to step S504.

If the result of judgment in step S502 shows that the secondary device 140 is not connected to the primary device 120, that is, if the form of the smoking system 100 is the second use form, the control part sets the mode of the smoking system 100 to the normal smoking mode or the normal non-smoking mode, in step S524. For example, in the case that the main power source button (the user manipulation part 152) in the secondary device 140 is manipulated to turn on, the control part makes the smoking system 100 to operate in the normal smoking mode. As a result, electric power is supplied from the secondary power source 148 in the secondary device 140 to the load 144, and a user can perform a smoking action by using the secondary device 140 only. Further, for example, in the case that the main power source button in the secondary device 140 is manipulated to turn off, the control part makes the smoking system 100 to operate in the normal non-smoking mode. As explained above, the secondary device 140 can operate independently in the second use form in which the secondary device 140 is disconnected from the primary device 120.

FIG. 6 is a flow chart showing another example process 600 for making the control part (the control part 134 and/or the control part 154) in the smoking system 100 according to an embodiment of the present invention to perform control for switching between operation modes of the smoking system 100. The process 600 is different from the above-explained process 500 in the point that it comprises steps S519 and S521 that are performed when it is judged in step S518 that the state of the holding part 120B is changed to the non-holding state.

In step S519, the control part judges whether the aerosol generating article 160 is being inserted into the aerosol generating article holding part 142 in the secondary device 140. After manipulation for inserting the aerosol generating article 160 into the aerosol generating article holding part 142 is completed, the process 600 proceeds to step S522 (that is the same as that explained in relation to the process 500) to execute the direct heating mode. On the other hand, if the aerosol generating article 160 has not yet been inserted into the aerosol generating article holding part 142, the process 600 proceeds to step S521.

In step S521, the control part performs control for changing the mode of the smoking system 100 from the charging mode to the transition mode. For example, the control part maintains an OFF state, that is the same as the state in the charging mode, of each of the first switch SW1 and the second switch SW2, and changes the state of the third switch SW3 from an ON state to an OFF state in the driving circuit 146 in the secondary device 140. Further, the control part controls the DC/DC converter 124-1 in the primary device 120 to change the quantity of electric power supplied from the primary device 120 to the secondary device 140 from the quantity of electric power supplied in the charging mode, that is low, to the quantity of electric power supplied in the direct heating mode, that is high. The above control corresponds to the control performed in the transition mode in the timing chart shown in FIG. 4D. By performing such control in the transition mode, heating of the load 144, without an object to be heated by the load 144, can be prevented.

After step S521, the process 600 repeats judgment in step S519. Thus, until the aerosol generating article 160 is inserted into the aerosol generating article holding part 142, the transition mode in step S521 is continuously executed. By using, as a trigger for changing the mode of the smoking system 100, an event that the aerosol generating article 160 is inserted into the aerosol generating article holding part 142 by a user, the smoking system 100 can be operated to change its mode to the direct heating mode.

In this regard, it should be reminded that in the process 500 shown in FIG. 5, the control part (the control part 134 and/or the control part 154) may change the mode of the smoking system 100 from a mode before the changing process (the direct heating mode or the charging mode) to the transition mode, based on the state of the holding part 120B. Further, in the process 600 shown in FIG. 6, the control part (the control part 134 and/or the control part 154) may change the mode of the smoking system 100 from the charging mode to the transition mode, based on judgment regarding whether the aerosol generating article 160 is being inserted into the aerosol generating article holding part 142, in addition to the state of the holding part 120B. Alternatively, the condition for allowing changing of the mode from a mode before the changing process to the transition mode may relate only to judgment regarding whether the aerosol generating article 160 is being inserted into the aerosol generating article holding part 142. In another alternative example, an input to the user manipulation part 132 or 152 may be used.

As explained above, the control part (the control part 134 and/or the control part 154) in the smoking system 100 changes the mode of the smoking system 100 from a mode before the changing process (the direct heating mode or the charging mode) to the transition mode, based on conditions that require tangible and direct user manipulation, such as the state of the holding part 121B, the state regarding whether the aerosol generating article 160 is being inserted into the aerosol generating article holding part 142, an input to the user manipulation part 132 or 152, and so on. In place thereof, it may be possible to change the mode of the smoking system 100 from a mode before the changing process (the direct heating mode or the charging mode) to the transition mode, based on a condition that does not relate to user manipulation or a condition relating to more indirect user manipulation. Regarding an example of a condition relating to more indirect user manipulation, it may be possible to use information regarding whether the remaining capacity of the aerosol generating article 160 is below a predetermined threshold. The control part (the control part 134 and/or the control part 154) may estimate the remaining capacity of the aerosol generating article 160, by use of the number of times of smoking actions, or by use of a value representing an accumulated length of time of supply of electric power or a value representing an accumulated quantity of electric power supplied from the secondary power source 148 to the load 144, since a new aerosol generating article 160 is inserted into the aerosol generating article holding part 142. It should be reminded that the method for estimating the remaining capacity of the aerosol generating article 160 is not limited to those explained above, and various methods can be adopted. Also, it may be possible to use a sensor which can precisely measure the remaining capacity of the aerosol generating article 160. Regarding such a sensor, a weight sensor, an optical sensor, and so on may be used, for example.

Figure 7A:
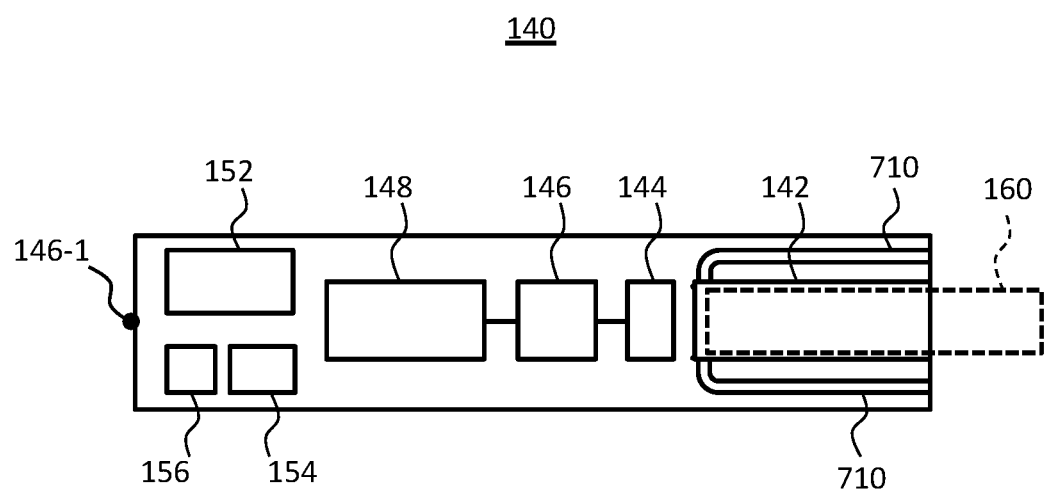
FIG. 7A shows an example of an air taking-in flow path 810 constructed in a secondary device 140.
Figure 7B:
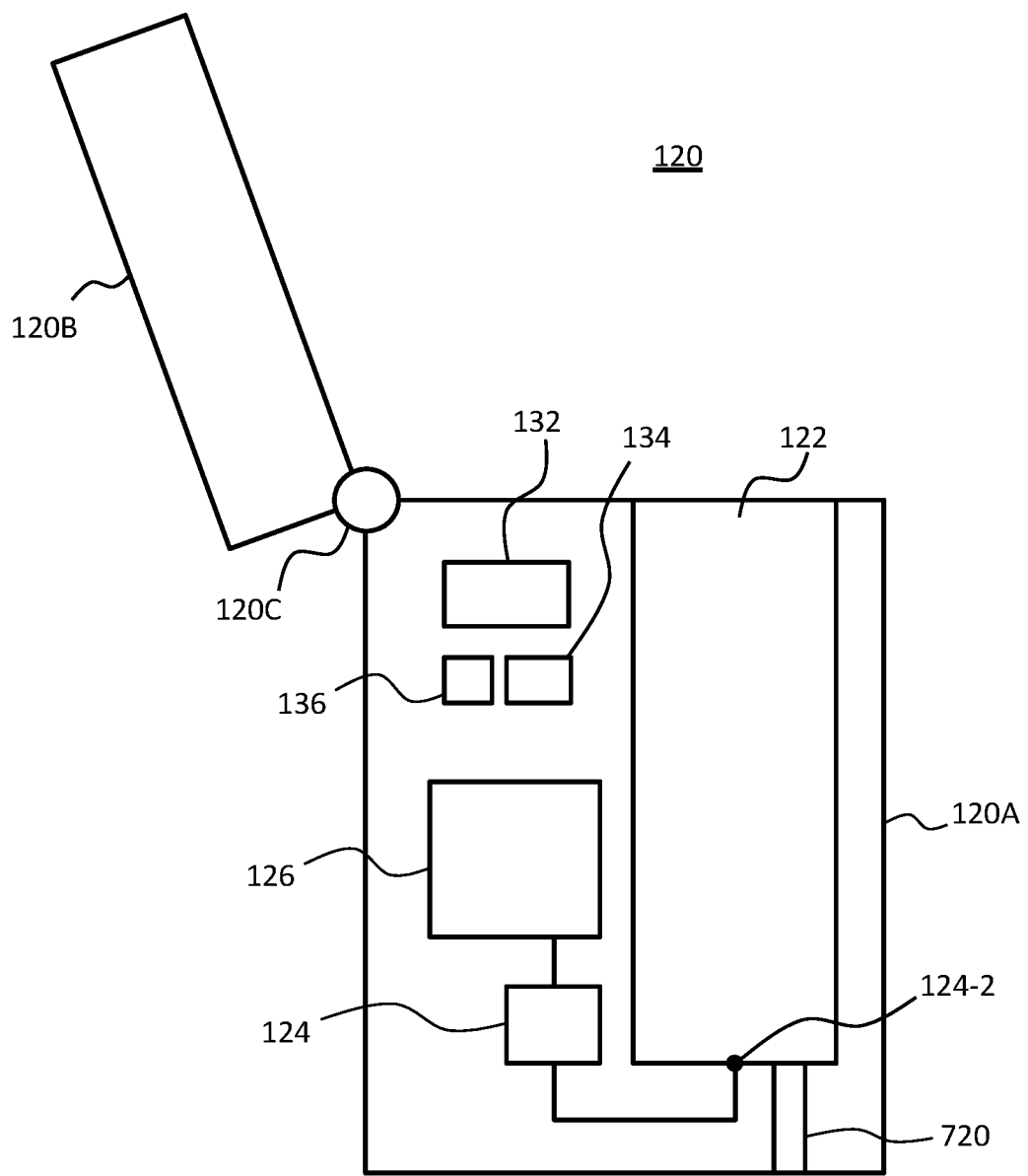
FIG. 7B shows an example of an air taking-in flow path 820 constructed in a primary device 120.

FIG. 7A shows an example of an air taking-in flow path 710 constructed in the secondary device 140. FIG. 7B shows an example of an air taking-in flow path 720 constructed in the primary device 120. The smoking system 100 is constructed in such a manner that a smoking action can be performed by inserting the secondary device 140 into the connection port 122 in the primary device 120 in the first use form (the direct heating mode); thus, it is necessary to have a construction for supplying a sufficient quantity of air to the aerosol generating article 160 even in the state that the secondary device 140 is being inserted into the connection port 122. The example air taking-in flow path 710 constructed in the secondary device 140 allows the air to be taken from the opening side of the aerosol generating article holding part 142 into the inside and flown toward the vicinity of the load 144. On the other hand, the air taking-in flow path 720 constructed in the primary device 120 is constructed to take the air form a bottom part of the main body 120A of the primary device 120 into the inside and guide the air to the deepest part in the connection port 122. The air guided into the connection port 122 via the air taking-in flow path 720 is further guided to the vicinity of the load 144 in the secondary device 140 via an air taking-in flow path, which is different from the air taking-in flow path 710 shown in FIG. 7A, in the secondary device 140, wherein the air taking-in flow path is formed to have an opening at a top part (the end part positioned opposite to the aerosol generating article holding part 142) of the secondary device 140 that is inserted in the connection port 122 (the secondary device 140 is not shown in FIG. 7B). The smoking system 100 may comprise one of the air taking-in flow path 710 and the air taking-in flow path 720, or both of them. By use of the air taking-in flow path 710 and/or the air taking-in flow path 720, a sufficient quantity of air can be supplied to the aerosol generating article 160 in the secondary device 140, even in the case that a smoking action is performed by inserting the secondary device 140 into the connection port 122 in the primary device 120 in the direct heating mode.

Further, although flow of electric power in the direct heating mode, the transition mode, and the charging mode is controlled by switching the state of each of the first switch SW1, the second switch SW2, the third switch SW3, and the fourth switch SW4 between an ON state and an OFF state in the above embodiments, the means for controlling the flow of electric power in each mode is not limited to those explained above. For example, it may be possible to add backflow preventing diodes to a circuit in the driving circuit 146 in FIG. 2, specifically, add the diodes to the circuit comprising branch lines which are divided from a main positive bus and a main negative bus, which connect the connection terminal 146-1 to the load 144, and extended to reach the secondary power source 148, respectively; wherein the direction of charging from the primary power source 126 to the secondary power source 148 is the forward direction of each of the backflow preventing diodes. In the direct heating mode wherein supply of electric power from the primary power source 126 to the secondary power source 148 is stopped, the DC/DC converter 124-1 in the primary device 120 may be controlled in such a manner that an output voltage of the primary device 120 is made to be lower than a voltage across the terminals of the secondary power source 148. On the other hand, in the charging mode wherein electric power is supplied from the primary power source 126 to the secondary power source 148, the DC/DC converter 124-1 in the primary device 120 may be controlled in such a manner that an output voltage of the primary device 120 is made to be higher than a voltage across the terminals of the secondary power source 148.

It should be reminded that the means for adjusting a relative voltage between a voltage across terminals of the primary power source 126 and a voltage across terminals of the secondary power source 148 is not limited to the DC/DC converter 124-1 in the primary device 120. For example, the secondary device 140 may also be provided with a DC/DC converter. In another example, at least one of the primary power source 126 and the secondary power source 148 may be constructed by use of plural power storage devices, and a series connection configuration and a parallel connection configuration thereof may be switched between them.

Although the embodiments of the present invention have been explained in the above description, the present invention is not limited to the embodiments, and the embodiments can be modified in various ways without departing from the scope of the gist of the present invention.

For example, although an example wherein the primary device 120 in the direct heating mode supplies electric power to the load 144 in the secondary device 140 only, and the primary device 120 in the charging mode supplies electric power to the secondary power source 148 in the secondary device 140 only is explained in the above description relating to the embodiments, the embodiments are not limited by the above example, and it may be possible to supply part of electric power to the load 144 and part of the electric power to the secondary power source 148 in the secondary device 140 at the same time.

REFERENCE SIGNS LIST

100 Smoking system
120 Primary device
120A Main body part
120B Holding part (lid)
120C Hinge
122 Connection port
124 Electric power supplying circuit
124-1 DC/DC converter
124-2 Connection terminal
126 Primary power source
132 User manipulation part
134 Control part
136 Memory
140 Secondary device
142 Aerosol generating article holding part
144 Load
146 Driving circuit
146-1 Connection terminal
148 Secondary power source
152 User manipulation part
154 Control part
156 Memory
160 Aerosol generating article
200 Electric circuit
710 Air taking-in flow path
720 Air taking-in flow path

The invention claimed is:

1. A smoking system comprising:
a secondary device which comprises a load for atomizing an aerosol source or heating a flavor source, and a power source configured to supply electric power to the load;
a primary device configured to electrically connect to the secondary device and to supply electric power to the load and the power source; and
a control part configured to cause the primary device, in a first mode, to supply electric power to the load and cause the primary device, in a second mode, to supply electric power to the power source,
wherein, the control part is configured to execute, at a timing between the first mode and the second mode in at least one of a first transition, that is a transition from the first mode to the second mode, and a second transition, that is a transition from the second mode to the first mode, a transition mode for causing the primary device not to supply electric power to the power source, the transition mode having a transition time for changing a predetermined variable relating to supply of electric power.

2. The smoking system according to claim 1, wherein the control part is configured to execute the transition mode in both the first transition and the second transition.

3. The smoking system according to claim 2, wherein the length of the transition time in the transition mode in the first transition is different from the length of the transition time in the transition mode in the second transition.

4. The smoking system according to claim 3, wherein the length of the transition time in the transition mode in the first transition is shorter than the length of the transition time in the transition mode in the second transition.

5. The smoking system according to claim 1,
wherein the predetermined variable is a quantity of electric power supplied from the primary device to the secondary device, and
wherein the control part is configured to execute the respective modes in such a manner that:
a first quantity of electric power is supplied from the primary device to the load in the first mode;
a process for reducing the quantity of to-be-supplied electric power from the first quantity is applied to the primary device, and supply of electric power from the primary device to the power source is not performed, in the transition mode in the first transition; and
a second quantity, that is smaller than the first quantity, of electric power is supplied from the primary device to the power source in the second mode.

6. The smoking system according to claim 1, further comprising:
a means configured to switch between a state that electric power can be supplied from the primary device to the power source and a state that electric power cannot be supplied from the primary device to the power source,
wherein the predetermined variable is a quantity of electric power supplied from the primary device to the secondary device,
wherein the control part is configured to execute the respective modes in such a manner that:
a first quantity of electric power is supplied from the primary device to the load, in the first mode;
the means is controlled to enter the state that electric power cannot be supplied from the primary device to the power source, and a process for reducing the quantity of to-be-supplied electric power from the first quantity is applied to the primary device, in the transition mode in the first transition; and
the means is controlled to enter the state that electric power can be supplied from the primary device to the power source, and a second quantity, that is smaller than the first quantity, of electric power is supplied from the primary device to the power source, in the second mode.

7. The smoking system according to claim 6,
wherein the means is a switch positioned between the primary device and the power source, and
wherein the control part is configured to:
electrically disconnect the primary device from the power source by performing control for opening the switch in the transition mode in the first transition; and
electrically connect the primary device to the power source by performing control for closing the switch in the second mode.

8. The smoking system according to claim 6, further comprising:
a diode positioned between the primary device and the power source, and a forward direction of the diode is a direction from the primary device to the power source,
wherein the means is a regulator which can adjust a relative voltage between an output voltage of the primary device and a voltage of the power source, and
wherein the control part is configured to:
control the regulator for making the output voltage of the primary device to be higher than the voltage of the power source in the transition mode in the first transition; and
control the regulator for making the voltage of the power source to be higher than the output voltage of the primary device in the second mode.

9. The smoking system according to claim 5, wherein the control part is configured to apply, to the primary device, a process for gradually reducing the quantity of to-be-supplied electric power from the first quantity to the second quantity, and is configured to supply the gradually reducing quantity of electric power from the primary device to the load.

10. The smoking system according to claim 5, wherein the control part is configured to not supply electric power from the primary device to the power source and the load in the transition mode in the first transition.

11. The smoking system according to claim 10, further comprising:
a switch that is positioned between the primary device and the power source and the load, and can switch between a state that electric power can be supplied from the primary device to the power source and the load and a state that electric power cannot be supplied from the primary device to the power source and the load, and
wherein the control part is configured to electrically disconnect the primary device from the power source and the load, by performing control to open the switch, in the transition mode in the first transition.

12. The smoking system according to claim 1,
wherein the primary device comprises a holding part that can hold connection between the secondary device and the primary device in a holding state, and can release the connection in a non-holding state, and
wherein the control part is configured to discriminate between the first transition and the second transition based on the state of the holding part.

13. The smoking system according to claim 12, wherein the control part is configured to keep the transition mode in the second transition, until the load is brought into contact with an aerosol generating article comprising an aerosol source in the non-holding state.

14. The smoking system according to claim 6, wherein the control part is configured to apply, to the primary device, a process for gradually reducing the quantity of to-be-supplied electric power from the first quantity to the second quantity, and is configured to supply the gradually reducing quantity of electric power from the primary device to the load.

15. The smoking system according to claim 7, wherein the control part is configured to apply, to the primary device, a process for gradually reducing the quantity of to-be-supplied electric power from the first quantity to the second quantity, and is configured to supply the gradually reducing quantity of electric power from the primary device to the load.

16. The smoking system according to claim 8, wherein the control part is configured to apply, to the primary device, a process for gradually reducing the quantity of to-be-supplied electric power from the first quantity to the second quantity, and is configured to supply the gradually reducing quantity of electric power from the primary device to the load.

* * * * *